Feb. 10, 1925.
M. M. DESSAU
RUBBER ARTICLE
Filed Sept. 3, 1924
1,526,267
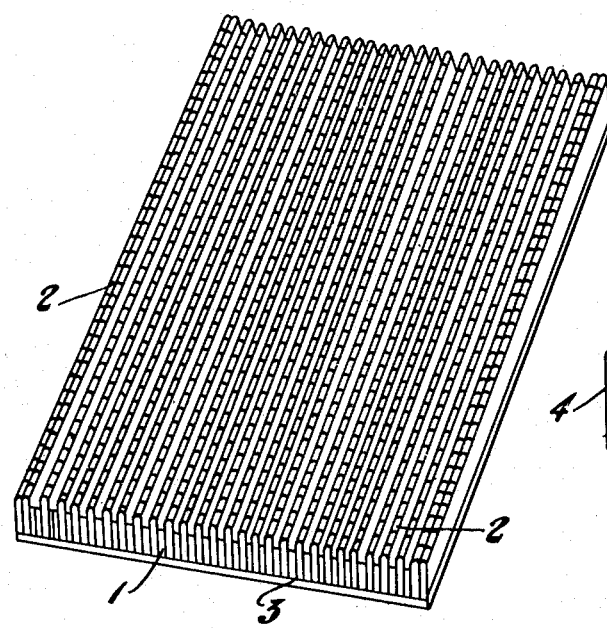
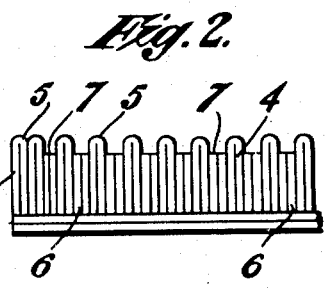
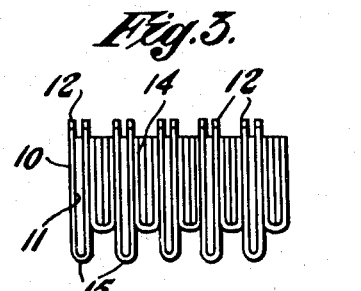
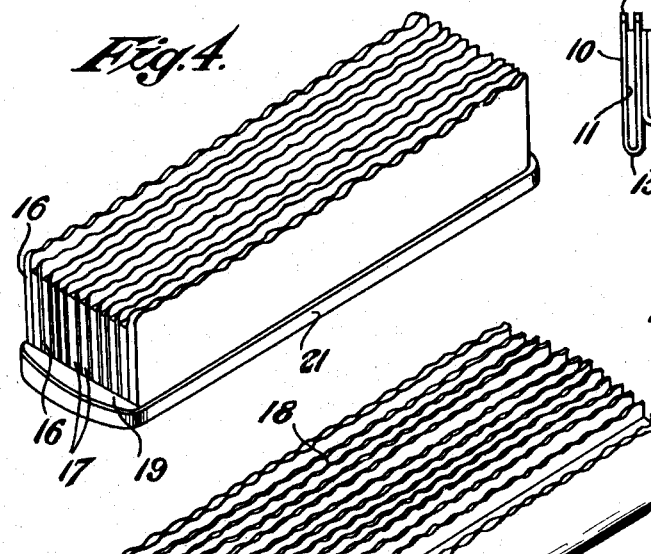
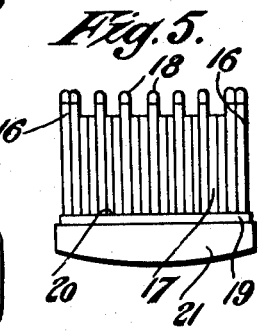
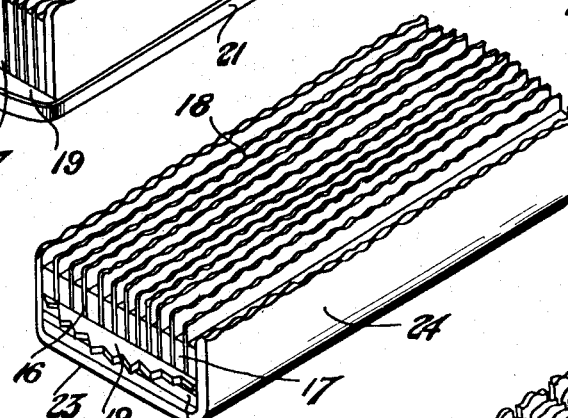
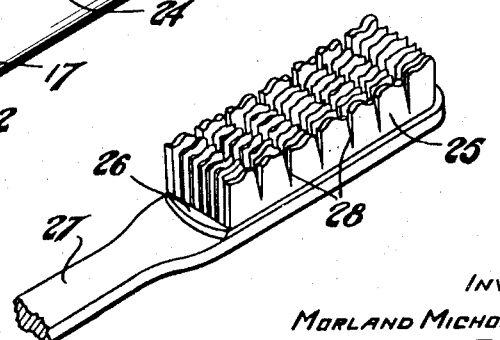
INVENTOR
MORLAND MICHOLL DESSAU
PER:- Rayner &
ATTORNEYS.

Patented Feb. 10, 1925.

1,526,267

UNITED STATES PATENT OFFICE.

MORLAND MICHOLL DESSAU. OF LONDON, ENGLAND.

RUBBER ARTICLE.

Application filed September 3, 1924. Serial No. 735,651.

*To all whom it may concern:*

Be it known that I, MORLAND MICHOLL DESSAU, a citizen of the United States, residing at 14 Mincing Lane, London, England, have invented new and useful Improvements in Rubber Articles, of which the following is a specification.

My invention relates to improved articles of the type constructed of a plurality of strips of material which are located side by side with their edges forming the exposed or operative surface of the resulting article.

The object of this invention is to provide improved articles of this type whereby the resulting character of their surfaces may be made to meet widely varying requirements so that the construction may be successfully and advantageously employed in the manufacture of a large and varied range of articles.

According to this invention, I construct the article by placing a plurality of separate strips side by side so that the edges of alternate strips or groups of two or more strips, project beyond the intermediate strips. The strips with the projecting edges are formed of rubber, rubber crêpe or other rubber product, and the projecting edges are of a waved, serrated or equivalently sinuous shape. In the majority of cases I prefer to construct the strips disposed intermediately of the projecting strips also of rubber or rubber product, and to employ rubber latex for securing the strips to each other.

A backing of one or more sheets of rubber may be provided and similarly secured.

In some cases the strips may be assembled so that selected edges project on both sides of the resulting construction.

After the rubber strips have been assembled and cemented to each other, the whole assembly may be vulcanized by the Peachey process, or other suitable gaseous or cold vulcanizing process. If desired suitable tufts of bristles, fibres or the like or strips of fabric or other suitable material may be incorporated in the article or sheet by securing them between adjacent strips of rubber or rubber crêpe.

In building up sheets of material for floor covering, mats, shoe soles or for subsequent manufacture into smaller articles, mechanical means may be employed for assembling and securing the strips of rubber in their correct positions.

In order that my invention may be more readily understood its application will be illustrated by means of examples shown in the accompanying drawings in which:—

Fig. 1 is a perspective view showing a piece of sheet material built up according to my invention.

Fig. 2 is a detail cross section through a piece of material showing one method of arranging the strips.

Fig. 3 is a similar view to Fig. 2 showing another method of arranging the strips so as to provide an operative surface on both sides.

Fig. 4 is a perspective view showing the application of my invention to the construction of a nail brush.

Fig. 5 is an end view of the nail brush showing the arrangement of the strips.

Fig. 6 is a perspective view of a combined nail brush and scrubber constructed wholly of rubber, and Fig. 7 is a perspective view of a tooth brush constructed according to my invention.

Referring to Fig. 1, a sheet of material of any desired size may be constructed by securing alternately wide and narrow strips 1 and 2 together side by side so that they stand up on edge. The lower edges of all these strips 1 and 2 rests upon the same plane whilst the upper edges which are serrated as shown in Fig. 1 are on different levels, the edges of the strips 2 projecting above the edges of the strips 1. The serrated edges of the strips 2 therefore become the effective face of the sheet, and afford a soft and resilient surface thereto. This surface is also of a highly non-slipping character rendering it suitable for use as floor coverings, stair treads, mats for motor cars, doorways and the like, and many other similar purposes. The underface of the material is preferably covered by a layer 3 of rubber or rubber crêpe or any other suitable material to act as a backing to the strips 1 and 2 and this is firmly secured to them by latex or other suitable adhesive. The whole of the strips and the backing are subject to a suitable gaseous or cold vulcanizing process such as the Peachy process.

In Fig. 2 is shown one method of arranging the strips to build up a sheet of material.

In this case wide strips 4 are doubled over upon each other and their upper edges 5 are serrated or shaped of undulating or other equivalent irregular form. Between these wide strips 4 are placed narrower strips 6 which may be doubled, or two or more strips placed together side by side so as to bring up the required thickness to produce any desired space 7 between the edges 5 of the wide strips 4. The sheet is then backed by two or more layers of backing material 8 so as to produce a flat surface. These are all caused to adhere together and vulcanized as previously described.

Fig. 3 illustrates another arrangement of the strips so as to produce a resilient surface of projecting strips upon both sides of the resultant sheet. In this arrangement a wide strip 10 is folded double over a slightly narrower strip 11 so as to produce a compound strip with the two free edges 12 of the strip 10 projecting beyond the strip 11. These compound strips are separated by narrower strips 14 built up of any suitable number of layers of sheet material folded over upon themselves to produce the desired thickness of strip. These spacing strips 14 are considerably narrower than the compound strips 10 and are arranged between them so that their free edges 12 project upon one side, whilst the folded edges 15 project upon the other side of the resultant sheet. In this manner, a sheet of material is produced having a resilient surface of projecting edges upon both sides, the two surfaces being of a somewhat different character and of varying resilience. Many other examples of methods of building up sheet material could be given, but it is to be understood that any suitable arrangement and spacing of alternate strips may be employed to produce a sheet of material having any desired characteristic surface and if desired two sets of similar strips may be arranged so that their edges overlap each other upon opposite sides thus producing a sheet having a similar resultant surface upon both sides. If on the other hand the thickness of these strips be varied then a double surface material of different texture may be obtained by this method.

Figs. 4 and 5 illustrate a brush for nail cleaning, scrubbing, scouring or other purposes, in which alternate wide and narrow strips 16 and 17 of crêpe rubber are provided so that the serrated edges 18 of the strips 16 project and form the scrubbing surface of the brush. The outer strips 16 are shown double so as to provide a stiffer edge to the brush. A sheet of backing material 19 is secured to the underface 20 of the strips 16 and 17 and this is in turn mounted upon a base 21 of wood, xylonite or any other suitable rigid or semi-rigid material to form the brush back.

In Fig. 6 is shown a scrubbing or scouring brush constructed similarly to the brush illustrated in Figs. 4 and 5 but in which the back of the brush is built up of a series of layers 22 of crêpe rubber or the like made to adhere to the backing strip 19 and subsequently covered by a sheet 23 whose sides 24 are bent round and secured to the sides of the brush as shown. Fig. 7 illustrates a tooth brush constructed according to my invention in which the effective surface of the brush 25 is built up of alternate wide and narrow strips as described above. These are secured by a packing strip 26 to a suitable handle 27. The effective portion of the brush 25 is divided by a series of transverse cuts or slits 28 so as to render the brush more resilient and to more closely resemble a tooth brush of the bristle type.

The methods and articles illustrated in the drawings are given merely by way of examples, and it is to be understood that the methods described may be applied to any suitable articles and utilized for any practicable purpose within the limits of this invention.

I claim:—

1. A rubber article comprising strips of rubber arranged on edge, intermediate rubber strips of less width than and arranged on edge between the first set of strips, so that the exposed edges of the first named strips project beyond the corresponding edges of the intermediate strips, and a sheet of rubber arranged on and covering the opposite edges of all of the strips and forming a backing to said article, said strips and said backing being cemented together.

2. A rubber article comprising strips of rubber folded so that their edges are close together, a second set of strips arranged intermediate of the first set of strips, the said folded strips being arranged with their outer doubled edges projecting beyond the edges of the intermediate strips, and means for holding the strips together.

MORLAND MICHOLL DESSAU.